United States Patent
Hayashi et al.

(10) Patent No.: US 11,621,424 B2
(45) Date of Patent: Apr. 4, 2023

(54) ELECTROCHEMICAL DEVICE AND METHOD FOR MANUFACTURING ELECTROCHEMICAL DEVICE

(71) Applicant: Panasonic Intellectual Property Management Co., Ltd., Osaka (JP)

(72) Inventors: Hiroki Hayashi, Kyoto (JP); Takumi Yamaguchi, Kyoto (JP); Nao Matsumura, Osaka (JP); Yasuyuki Ito, Osaka (JP); Motohiro Sakata, Osaka (JP); Hideo Sakata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 130 days.

(21) Appl. No.: 17/042,092

(22) PCT Filed: Apr. 24, 2019

(86) PCT No.: PCT/JP2019/017411
§ 371 (c)(1),
(2) Date: Sep. 26, 2020

(87) PCT Pub. No.: WO2019/216219
PCT Pub. Date: Nov. 14, 2019

(65) Prior Publication Data
US 2021/0057754 A1 Feb. 25, 2021

(30) Foreign Application Priority Data

May 7, 2018 (JP) .............................. JP2018-089544

(51) Int. Cl.
*H01M 4/133* (2010.01)
*H01M 4/137* (2010.01)
(Continued)

(52) U.S. Cl.
CPC ........... *H01M 4/661* (2013.01); *H01M 4/133* (2013.01); *H01M 4/137* (2013.01);
(Continued)

(58) Field of Classification Search
CPC ..... H01M 4/667; H01M 4/661; H01M 4/0445
See application file for complete search history.

(56) References Cited

U.S. PATENT DOCUMENTS

| 4,585,715 A | * | 4/1986 | Marple | ................. H01M 4/664 429/224 |
| 2016/0190545 A1 | * | 6/2016 | Momo | ................ H01M 10/058 429/231.95 |

(Continued)

FOREIGN PATENT DOCUMENTS

| JP | 61-019064 | 1/1986 |
| JP | 2014-035836 | 2/2014 |

(Continued)

OTHER PUBLICATIONS

Guoxin, Li, "Introduction to Novel Chemical Power Source Technology (Partial English Translation)", Shanghai Scientific & Technical Publishers, May 31, 2007 (May 31, 2007), edition No. 1, pp. 353-354. (Year: 2007).*

(Continued)

*Primary Examiner* — Ula C Ruddock
*Assistant Examiner* — Amanda Rosenbaum
(74) *Attorney, Agent, or Firm* — McDermott Will & Emery LLP

(57) ABSTRACT

An electrochemical device of the present invention includes a positive electrode, a negative electrode, and a separator disposed between the positive electrode and the negative electrode. The positive electrode includes a positive current collector containing aluminum, a positive electrode material layer containing a conductive polymer, and an aluminum (Continued)

oxide layer disposed on a surface of the positive current collector. The aluminum oxide layer contains fluorine.

15 Claims, 2 Drawing Sheets

(51) Int. Cl.

| | | |
|---|---|---|
| *H01M 4/1399* | (2010.01) | |
| *H01M 4/66* | (2006.01) | |
| *H01M 4/02* | (2006.01) | |
| *H01G 11/28* | (2013.01) | |
| *H01G 11/50* | (2013.01) | |
| *H01M 4/04* | (2006.01) | |
| *H01M 50/46* | (2021.01) | |

(52) U.S. Cl.
CPC ......... *H01M 4/1399* (2013.01); *H01M 50/46* (2021.01); *H01M 2004/021* (2013.01); *H01M 2004/028* (2013.01)

(56) References Cited

U.S. PATENT DOCUMENTS

2016/0254572 A1* 9/2016 Yu .................. H01M 4/661
429/126
2018/0375084 A1 12/2018 Furusawa et al.

FOREIGN PATENT DOCUMENTS

| JP | 2014035836 A | * | 2/2014 | |
|---|---|---|---|---|
| JP | 2017-050170 | | 3/2017 | |
| WO | 2013/062088 | | 5/2013 | |
| WO | WO-2013062088 A1 | * | 5/2013 | ............. C09J 11/04 |
| WO | 2017/163726 A1 | | 9/2017 | |

OTHER PUBLICATIONS

Smekens, Jelle, et al. "Influence of electrode density on the performance of Li-ion batteries: Experimental and simulation results." Energies 9.2 (2016): 104. (Year: 2016).*
Li, Shengyi, and Benjamin C. Church. "Electrochemical Stability of Aluminum Current Collector in Aqueous Rechargeable Lithium-Ion Battery Electrolytes." Journal of Applied Electrochemistry 47.7 (2017): 839-853. (Year: 2017).*
Morita, Masayuki, et al. "Anodic behavior of aluminum in organic solutions with different electrolytic salts for lithium ion batteries." Electrochimica Acta 47.17 (2002): 2787-2793. (Year: 2002).*
English Translation of Chinese Office Action dated Sep. 3, 2021 for the related Chinese Patent Application No. 201980029746.6.
Guoxin Li, "Introduction to Novel Chemical Power Source Technology (Partial English Translation)", Shanghai Scientific & Technical Publishers, May 31, 2007(May 31, 2007), edition No. 1, pp. 353-354.
International Search Report of PCT application No. PCT/JP2019/017411 dated Jul. 9, 2019.

* cited by examiner

ELECTROCHEMICAL DEVICE AND METHOD FOR MANUFACTURING ELECTROCHEMICAL DEVICE

TECHNICAL FIELD

The present invention relates to an electrochemical device including a positive electrode material layer containing a conductive polymer, and to a method for manufacturing the electrochemical device.

BACKGROUND

In recent years, a device (electrochemical device) having performance intermediate between a lithium ion secondary battery and an electric double layer capacitor attracts attention, and for example, use of a conductive polymer as a positive electrode material is considered (see Unexamined Japanese Patent Publication No. 2014-35836). Since the electrochemical device containing the conductive polymer as the positive electrode material can be charged and discharged by adsorption (doping) and desorption (dedoping) of anions, the electrochemical device has small reaction resistance and has higher output than output of a general lithium ion secondary battery.

SUMMARY

In the conventional electrochemical device that includes a positive electrode including a positive electrode material layer containing the conductive polymer, which is formed on a positive current collector, suppression of self-discharge after charged is not sufficient.

In view of the above problem, an electrochemical device according to one aspect of the present invention includes a positive electrode, a negative electrode, and a separator disposed between the positive electrode and the negative electrode. The positive electrode includes a positive current collector containing aluminum, a positive electrode material layer containing a conductive polymer, and an aluminum oxide layer disposed on a surface of the positive current collector. The aluminum oxide layer contains fluorine.

A method for manufacturing an electrochemical device according to another aspect of the present invention includes: a step of forming a positive electrode including a positive current collector and a positive electrode material layer, the positive current collector containing aluminum, the positive electrode material layer containing a conductive polymer; a step of forming a negative electrode; a step of forming an electrode group including the positive electrode, the negative electrode, and a separator interposed between the positive electrode and the negative electrode; a step of housing the electrode group together with an electrolytic solution in a container; and a covering film formation step of covering a surface of the positive current collector with an aluminum oxide layer containing fluorine.

According to the present invention, self-discharge of the electrochemical device can be suppressed.

DESCRIPTION OF EMBODIMENT

Figure 1:
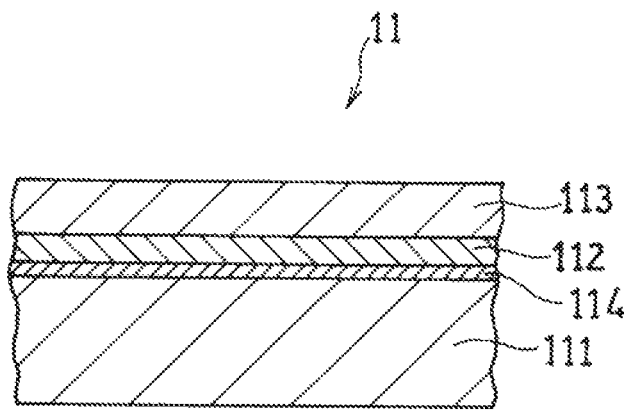
FIG. 1 is a schematic sectional view illustrating a positive electrode according to one exemplary embodiment of the present invention.

An electrochemical device according to the present exemplary embodiment includes a positive electrode, a negative electrode, and a separator disposed between the positive electrode and the negative electrode. The positive electrode includes a positive current collector containing aluminum and a positive electrode material layer containing a conductive polymer. Further, the positive electrode includes an aluminum oxide layer disposed on a surface of the positive current collector, and the aluminum oxide layer contains fluorine.

Hereinafter, the aluminum oxide layer containing fluorine which is formed on the surface of the positive current collector is sometimes referred to as a "F-containing aluminum oxide layer".

One of reasons for occurring self-discharge is considered to be a decomposition reaction of an electrolytic solution which is proceeded at an interface of the positive current collector. Generally, although aluminum used in the positive current collector includes a thin oxide covering film formed on a surface of the aluminum, it is hard to say that the oxide covering film has sufficient electrochemical stability.

In a state that the electrochemical device is sufficiently charged, a great amount of anions is adsorbed (doped) in a positive electrode active material. A part of these anions is reacted with water to produce an acid, for example. When the produced acid moves to the positive current collector, aluminum on a surface layer of the positive current collector may be dissolved, or a thick oxide covering film may be formed on a surface of the positive current collector. Further, the dissolved aluminum may react with an electrolytic component such as an anion. At this time, a part of electrochemical energy held by the electrochemical device is consumed by this reaction. As a result, capacitance usable via the electrochemical device is considered to be decreased.

According to the exemplary embodiment, an aluminum oxide layer containing fluorine is formed on the surface layer of the positive current collector. Since an atomic bond between an aluminum atom and a fluorine atom is stronger than an atomic bond between the aluminum atom and an oxygen atom, the aluminum oxide layer containing fluorine has increased corrosion resistance. Hence, a passive covering film that is more electrochemically stable can be formed on the surface of the positive current collector. This suppresses the decomposition reaction of the electrolytic solution which is proceeded at the interface of the positive current collector, and thus the self-discharge is suppressed.

The "F-containing aluminum oxide layer" may further contain phosphorus. By containing phosphorus, water wettability of the F-containing aluminum oxide layer decreases. Hence, even when the electrolytic solution contains water, hydration of aluminum oxide is suppressed, and thus degradation of the F-containing aluminum oxide layer is suppressed. As a result, the decomposition reaction of the electrolytic solution at the interface of the positive current collector can be further suppressed, and thus the self-discharge can be suppressed.

The F-containing aluminum oxide layer is preferably formed on an entirety of a surface of the positive current collector, which faces the positive electrode material layer. This configuration can prevent the electrolytic solution from being in contact with an aluminum layer inside the positive current collector, and thus the self-discharge can be further suppressed.

The positive electrode material layer has a porous structure. Hence, an interface between the positive current collector and the positive electrode material layer has a fine structure including a first region in which the positive current collector is in contact with the positive electrode material layer and a second region in which the positive current collector is not in contact with the positive electrode material layer. In the second region, the positive current collector is exposed. The F-containing aluminum oxide layer can be formed on the first region as well as the second region. Since the containing aluminum oxide layer is also formed on the first region, direct contact of the positive current collector with the positive electrode material layer can be prevented. The positive current collector is in contact with the positive electrode material layer via the F-containing aluminum oxide layer disposed between the positive current collector and the positive electrode material layer. Although resistance in the positive electrode is slightly increased because the positive current collector contacts with the positive electrode material layer via the F-containing aluminum oxide layer, this does not hinder operation as the electrochemical device.

A method for forming the F-containing aluminum oxide layer on the entirety of the surface of the positive current collector is, for example, a method for covering the surface of the positive current collector with an aluminum fluoride layer by a gas phase method such as a chemical vapor deposition (CVD) method or sputtering, and then forming the positive electrode material layer on the positive current collector.

Alternatively, it is possible to manufacture the electrochemical device using the positive current collector on which the aluminum oxide layer has not been formed, and then form the F-containing aluminum oxide layer at least on the entirety of the surface of the positive current collector, which faces the positive electrode material layer, by applying a charge voltage in presence of anions containing fluorine. In this process, voltage application may be performed in a long term while current value is limited to a value (for example, less than or equal to 10 mA) lower than a value during charging. By applying the voltage with the current value limited to a small current value, an uniform and dense F-containing aluminum oxide layer can be formed.

At this time, a total amount of electric charge Q flowed in the application of a charge voltage corresponding to the small current value is, for example, more than or equal to 100 mAh, preferably more than or equal to 150 mAh.

For example, when the electrolytic solution contains anions of a fluorine compound, the anions are diffused and/or reacted on the surface of the positive current collector so that, the F-containing aluminum oxide layer can be formed on the entirety of the surface of the positive current collector. The anion of a fluorine compound is, for example, $BF_4^-$ or $PF_6^-$.

Further, when the electrolytic solution contains anions containing phosphorus such as $PF_6^-$, the anions are diffused and/or reacted on the interface of the positive current collector so that the F-containing aluminum oxide layer containing phosphorus can be formed.

When the electrolytic solution contains anions of a fluorine compound, the anions are reacted on the surface of the positive current collector so that the F-containing aluminum oxide layer can be formed even in usual charge operation.

However, the F-containing aluminum oxide layer formed in the usual charge operation is considered to be an unstable film that is lack in film denseness, and thus is less likely to suppress the decomposition reaction of the electrolytic solution on the surface of the positive current collector. In contrast, the long-term voltage application performed at a small current in advance before use of a battery can form a dense and stable F-containing alum in oxide layer and suppress the decomposition reaction of the electrolytic solution on the surface of the positive current collector.

The F-containing aluminum oxide layer formed by the voltage application at a small current is considered to be different from the F-containing aluminum oxide layer that can be formed by the usual charge operation in a ratio between a crystalline phase and an amorphous phase and/or in a fluorine content. By charging at a small current in advance, a dense F-containing aluminum oxide layer, which has a high fluorine content and has the amorphous phase at an amount greater than an amount of the crystalline phase, can be formed.

Accordingly, when a charge step at a small current is performed and then a usual charge step is performed, the F-containing aluminum oxide layer includes a two-layer structure of a F-containing aluminum oxide layer (first layer) formed by the charge step at a small current and a F-containing aluminum oxide layer (second layer) that can be formed by the usual charge step. And the ratio between the crystalline phase and the amorphous phase and/or the fluorine content can be changed at a border between the first layer and the second layer. The first layer of the F-containing aluminum oxide layer has a higher ratio of the amorphous phase and/or a higher fluorine content than a ratio of the amorphous phase and a fluorine content of the second layer.

Meanwhile, there may be no border between the first layer and the second layer, and the ratio of the amorphous phase and/or the fluorine content may have a gradient distribution.

The F-containing aluminum oxide layer may have different thickness in each of the first region and the second region. In the first region, the positive current collector is in contact with the positive electrode material layer. In the second region, the positive current collector is not in contact with the positive electrode material layer and is exposed. When the F-containing aluminum oxide layer is grown by the application of a small current, the containing aluminum oxide layer easily has a larger thickness in the second region than in the first region because, in the second region, an electrolytic component can reach the surface of the positive current collector without passing via the positive electrode material layer.

When the F-containing aluminum oxide layer is formed on the surface of the positive current collector by the reaction of the anions containing fluorine, the positive electrode material layer may have a low density or a small thickness so that the anions can move up to the surface of the positive current collector via the positive electrode material layer.

When the density of the positive electrode material layer is defined as A ($g/cm^3$) and the thickness of the positive electrode material layer is defined as B ($\mu m$), a product of A and B may be less than or equal to 300 and is preferably less than or equal to 200 from a viewpoint of facilitating the movement of the anions from the positive electrode material layer up to the surface of the positive current collector. The product of A and B corresponds to mass per unit area (surface density) of the positive electrode material layer.

On the other hand, when the product of A and B is excessively small, an amount of a positive electrode active material in the positive electrode is small to make it difficult to obtain sufficient capacitance. From a viewpoint of securing sufficient capacitance, the product of A and B is preferably more than or equal to 4.

Specifically, the positive electrode material layer has a density A ranging, for example, from 0.2 g/cm$^3$ to 1.5 g/cm$^3$, inclusive. The positive electrode material layer has a thickness B ranging, for example, from 20 μm to 200 μm, inclusive.

The electrochemical device may include a carbon layer containing conductive carbon material, which is disposed between the positive electrode material layer and the F-containing aluminum oxide layer. By forming the carbon layer on the positive current collector, resistance of the positive current collector can be decreased.

The carbon layer has a density ranging, for example, from 0.4 g/cm$^3$ to 1.0 g/cm$^3$, inclusive. The carbon layer has a thickness ranging, for example, from 0.5 μm to 3.0 μm, inclusive.

Even when the F-containing aluminum oxide layer is formed on the surface of the positive current collector by the reaction of the anions containing fluorine, the carbon layer having a density and a thickness in this range enables the anions to easily move through the carbon layer. Hence, the F-containing aluminum oxide layer can be formed between the carbon layer and the positive current collector.

<<Electrochemical Device>>

An electrochemical device according the present exemplary embodiment includes an electrode group including a positive electrode, a negative electrode, and a separator disposed between the positive electrode and the negative electrode. The positive electrode includes, for example, as illustrated in FIG. 1, positive current collector 111, aluminum oxide layer (F-containing aluminum oxide layer) 114 formed on a surface of positive current collector 111, carbon layer 112 formed on aluminum oxide layer 114, and positive electrode material layer 113 formed on carbon layer 112. Carbon layer 112 contains a conductive carbon material, and positive electrode material layer 113 contains a conductive polymer. Aluminum oxide layer 114 contains fluorine and has high acid resistance. Aluminum oxide layer 114 suppresses exposure of positive current collector 111 to an acidic atmosphere and suppresses a reaction of positive current collector 111 with an electrolytic solution.

Figure 2:
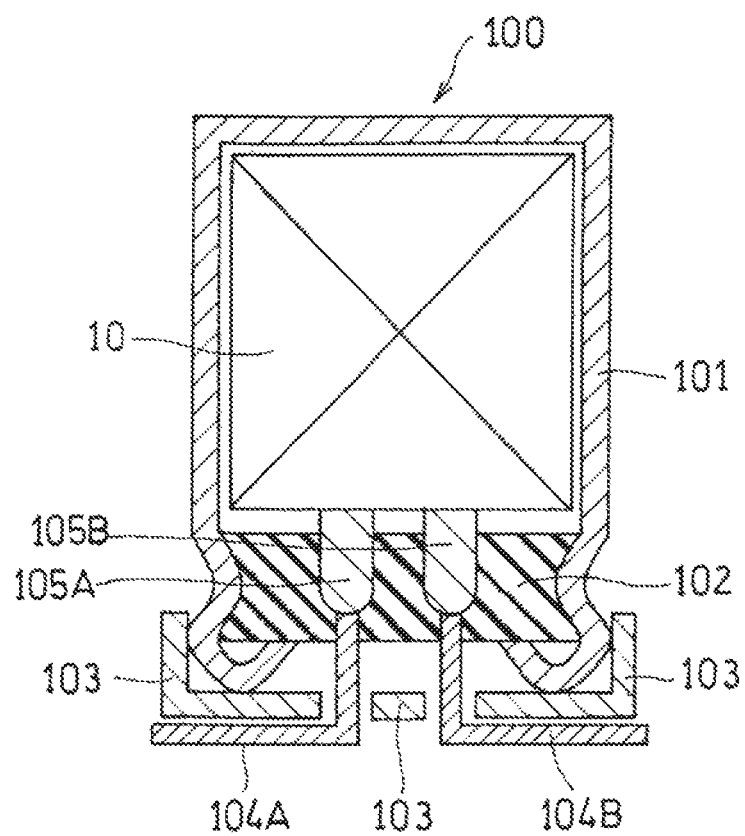
FIG. 2 is a schematic sectional view illustrating an electrochemical device according to the one exemplary embodiment of the present invention.
Figure 3:
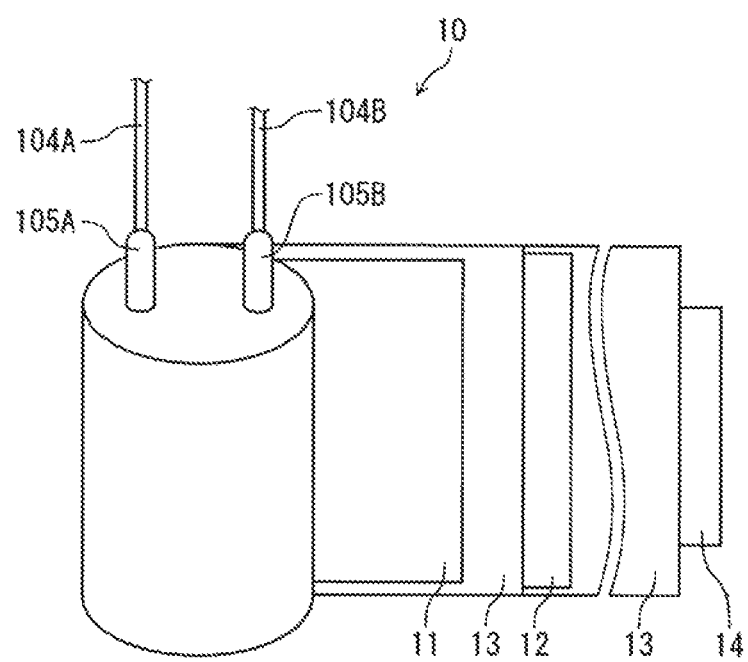
FIG. 3 is a schematic view illustrating a configuration of an electrode group according to the same exemplary embodiment.

Hereinafter, a configuration of an electrochemical device according to the present invention is described in more detail with reference to drawings. FIG. 2 is a schematic sectional view illustrating electrochemical device 100 according to the present exemplary embodiment, and FIG. 3 is a schematic developed view illustrating a part of electrode group 10 included in same electrochemical device 100.

Electrochemical device 100 includes electrode group 10, container 101 housing electrode group 10, sealing body 102 sealing an opening of container 101, base plate 103 covering sealing body 102, lead wires 104A, 104B led out from sealing body 102 and penetrating base plate 103, and lead tabs 105A, 105B connecting the lead wires to electrodes of electrode group 10, respectively. A part of container 101 near an opening end is drawn inward, and the opening end is curled to swage sealing body 102.

(Positive Current Collector)

As positive current collector 111, a sheet-shaped metallic material is used, for example. As the sheet-shaped metallic material, for example, a metal foil, a metal porous body, a punched metal, an expanded metal, and an etched metal are used. Positive current collector 111 contains aluminum, and metallic aluminum or an aluminum alloy is preferably used.

The aluminum alloy may contain an element (for example, iron, silicon, nickel, or manganese) other than aluminum at a proportion, for example, less than 50% by mass, preferably less than or equal to 0.5% by mass.

Positive current collector 111 has a thickness ranging, for example, from 10 μm to 100 μm, inclusive.

Positive current collector 111 may contain a carbon atom and/or a nitrogen atom.

(Aluminum Oxide Layer)

Aluminum oxide layer 114 contains fluorine and has high acid resistance.

Aluminum oxide layer 114 may further contain phosphorus. Even when the electrolytic solution contains water, aluminum oxide layer 114 containing phosphorus suppresses degradation caused by hydration.

Aluminum oxide layer 114 may be amorphous aluminum oxide containing fluorine or may be crystalline aluminum oxide containing fluorine. In terms of electric conductivity, amorphous aluminum oxide is more preferable than crystalline aluminum oxide. The aluminum oxide layer is likely to be amorphous when formed by the above-described application of a small current in present of an electrolytic solution containing anions of a fluorine compound after manufacturing of the electrochemical device.

Aluminum oxide layer 114 can be formed so as to cover an entirety of a surface of positive current collector 111 by a gas phase method such as a CND method or sputtering. When the electrolytic solution contains anions of a fluorine compound, the aluminum oxide layer can also be formed by application of a voltage to the positive electrode of the electrochemical device. The voltage is applied in a long term while current flowed in the electrochemical device is limited to a value smaller than a value during usual charge, so that a dense aluminum oxide layer containing fluorine can be formed on the surface of positive current collector 111.

Further, when the electrolytic solution contains anions containing phosphorus, aluminum oxide layer 114 formed by the application of a small current can contain phosphorus as well as fluorine. This aluminum oxide layer 114 can suppress degradation by hydration.

Aluminum oxide layer 114 has a film thickness of, for example, at least more than or equal to 1 nm, more preferably more than or equal to 3 nm, from a viewpoint of suppressing the reaction of positive current collector 111 with the electrolytic solution. Aluminum oxide layer 114 may have a film thickness of more than or equal to 5 nm or more than or equal to 10 nm. On the other hand, since aluminum oxide layer 114 has high resistance, aluminum oxide layer 114 having an excessively large film thickness increases internal resistance as the electrochemical device. From a viewpoint of maintaining the internal resistance low, aluminum oxide layer 114 has a film thickness of, for example, at least less than or equal to 100 nm, more preferably less than or equal to 30 nm.

Aluminum oxide layer 14 has a fluorine at content proportion ranging, for example, from 1 at % to 50 at %, inclusive, and may have a fluorine at content proportion ranging from 5 at % to 20 at %, inclusive.

When containing phosphorus, aluminum oxide layer 114 has a phosphorus at content proportion ranging, for example, from 1 at % to 50 at %, inclusive, and may have a phosphorus at content proportion ranging from 5 at % to 20 at %, inclusive.

The film thickness, the fluorine content proportion, and the phosphorus content proportion of aluminum oxide layer 114 can be identified by a following method, for example.

First, a cross section along a thickness direction of positive electrode 11 is observed with a transmission electron microscope (TEM). Elements in a surface region of positive current collector 111 are mapped using energy dispersive X-ray spectroscopy (EDX). A region in which aluminum and oxygen are present as main components is identified as the aluminum oxide layer. Further, in the region identified as the aluminum oxide layer, it is confirmed whether fluorine and phosphorus are contained from a result of the element mapping. The film thickness of aluminum oxide layer 114 is determined from an outline of the region identified. The film thickness of the aluminum oxide layer may be defined as a value obtained by measuring the film thickness in a plurality of cross sections at positions different in a planar direction of positive current collector 111 and averaging a plurality of measured values (for example, more than or equal to 10 points).

When the aluminum oxide layer contains fluorine and/or phosphorus, concentration of fluorine and/or phosphorus contained can be determined by composition analysis with an X-ray microanalyzer (XMA) in the region identified as the aluminum oxide layer. The concentration of fluorine and/or phosphorus contained may also be determined by performing the composition analysis at a plurality of locations (preferably more than or equal to 10 locations) in the identified region and averaging the plurality of locations.

(Carbon Layer)

Carbon layer 112 is formed by, for example, vapor deposition of a conductive carbon material on a surface of positive current collector 111 or aluminum oxide layer 114. Alternatively, carbon layer 112 is formed by, for example, applying a carbon paste containing a conductive carbon material to a surface of positive current collector 111 or aluminum oxide layer 114 to form a coating film and thereafter (frying the coating film. The carbon paste contains, for example, the conductive carbon material, a polymer material, and water or an organic solvent. From a viewpoint of acid resistance, carbon layer 112 is preferably formed by vapor deposition of the conductive carbon material. Carbon layer 112 has a thickness ranging, for example, from 1 μm to 20 μm, inclusive.

In this case, when alum in oxide layer 114 is formed on positive current collector 111 by a vapor deposition method such as a CVD method or sputtering, carbon layer 112 is formed on aluminum oxide layer 114. Meanwhile, when aluminum oxide layer 114 is formed by the application of a small current to the positive electrode of a manufactured electrochemical device, carbon layer 112 is formed on positive current collector 111, and aluminum oxide layer 114 grows between carbon layer 112 and positive current collector 111 by the application of a small current.

As the conductive carbon material, it is possible to use graphite, hard carbon, soft carbon, carbon black, and the like. Among these conductive carbon materials, carbon black is preferable in terms of easily forming carbon layer 112 that is thin and has excellent conductivity. An average particle diameter D1 of the conductive carbon material is not particularly limited, but ranges, for example, from 3 nm to 500 nm, inclusive, preferably from 10 nm to 100 nm, inclusive. The average particle diameter is a median diameter (D50) in a volume particle size distribution obtained by a laser diffraction particle size distribution measuring apparatus (the same applies hereinafter). The average particle diameter D1 of carbon black may be calculated by observation with a scanning electron microscope.

A material for the polymer material is not particularly limited, but fluorine resin, acrylic resin, polyvinyl chloride, styrene-butadiene rubber (SBR), liquid glass (sodium silicate polymer), and the like are preferably used in terms of having electrochemical stability and excellent acid resistance.

(Positive Electrode Material Layer)

Positive electrode material layer 113 contains a conductive polymer as a positive electrode active material. Positive electrode material layer 113 is formed by, for example, immersing positive current collector 111 on which carbon layer 112 has been formed in a reaction solution containing a raw material monomer of the conductive polymer and electrolytically polymerizing the raw material monomer in presence of positive current collector 111. At this time, the electrolytic polymerization is performed, with positive current collector 111 set as an anode, to form positive electrode material layer 113 containing a conductive polymer over a surface of carbon layer 112. The thickness of positive electrode material layer 113 can be easily controlled by appropriately changing, for example, current density in electrolysis or a polymerization time. Positive electrode material layer 113 has a thickness ranging, for example, from 10 μm to 300 μm, inclusive, per one surface.

Positive electrode material layer 113 may be formed by a method other than the electrolytic polymerization. Positive electrode material layer 113 containing a conductive polymer may be formed by, for example, chemically polymerizing a raw material monomer. Alternatively, positive electrode material layer 113 may be formed using the conductive polymer or a dispersion of the conductive polymer.

The raw material monomer used in the electrolytic polymerization or the chemical polymerization may be any polymerizable compound capable of producing the conductive polymer by the polymerization. The raw material monomer may include an oligomer. As the raw material monomer, for example, aniline, pyrrole, thiophene, furan, thiophene vinylene, pyridine, and derivatives of these monomers are used. A single one or two or more in combination of these raw material monomers may be used. The raw material monomer is preferably aniline in terms of easily forming positive electrode material layer 113 on the surface of carbon layer 112.

The conductive polymer is preferably a π-conjugated polymer. As the n-conjugated polymer, it is possible to use, for example, polypyrrole, polythiophene, polyfuran, polyaniline, polythiophene vinylene, polypyridine, and derivatives of these polymers. A single one or two or more in combination of these polymers may be used. A weight-average molecular weight of the conductive polymer is not particularly limited and ranges, for example, from 1000 to 100000, inclusive.

Derivatives of polypyrrole, polythiophene, polyfuran, polyaniline, polythiophene vinylene, and polypyridine mean polymers having, as a basic skeleton, polypyrrole, polythiophene, polyfuran, polyaniline, polythiophene vinylene, and polypyridine, respectively. For example, a polythiophene derivative includes poly(3,4-ethylenedioxythiophene) (PEDOT) and the like.

The electrolytic polymerization or the chemical polymerization is preferably performed using a reaction solution containing an anion (dopant). The dispersion liquid or the solution of the conductive polymer also preferably contains a dopant. A π-electron conjugated polymer doped with a dopant exerts excellent conductivity. For example, in the chemical polymerization, positive current collector 111 may be immersed in a reaction solution containing the dopant, an oxidant, and the raw material monomer, and thereafter picked out from the reaction solution and dried. On the other hand, in the electrolytic polymerization, positive current collector 111 and an opposite electrode may be immersed in a reaction solution containing the dopant and the raw material monomer while a current is flowed between the positive current collector and the opposite electrode, with positive current collector 111 set as an anode and the opposite electrode as a cathode.

As a solvent of the reaction solution, water may be used, or a nonaqueous solvent may be used in consideration of solubility of the monomer. As the nonaqueous solvent, for example, alcohols such as ethyl alcohol, methyl alcohol, isopropyl alcohol, ethylene glycol, and propylene glycol are preferably used. A dispersion medium or solvent of the conductive polymer is also exemplified by water and the nonaqueous solvents described above.

Examples of the dopant include a sulfate ion, a nitrate ion, a phosphate ion, a borate ion, a benzenesulfonate ion, a naphthalenesulfonate ion, a toluenesulfonate ion, a methanesulfonate ion ($CF_3SO_3$—), a perchlorate ion ($ClO_4$—), a tetrafluoroborate ion ($BF_4$—) a hexafluorophosphate ion ($PF_6$—), a fluorosulfate ion ($FSO_3$—), a bis(fluorosulfonyl)imide ion ($N(FSO_2)_2$—), and a bis(trifluoromethanesulfonyl)imide ion ($N(CF_3SO_2)_2$—). A single one or two or more in combination of these ions may be used.

The dopant may lie a polymer ion. Examples of the polymer ion include ions of polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These polymers may be a homopolymer or a copolymer of two or more monomers. A single one or two or more in combination of these ions may be used.

The reaction solution, or the dispersion liquid of the conductive polymer or the solution of the conductive polymer preferably has a pH ranging from 0 to 4, inclusive, in terms of easily forming positive electrode material layer 113.

(Negative Electrode)

Negative electrode 12 includes, for example, a negative current collector and a negative electrode material layer.

As the negative current collector, a sheet-shaped metallic material is used, for example. As the sheet-shaped metallic material, for example, a metal foil, a metal porous body, a punched metal, an expanded metal, and an etched metal are used. As a material for the negative current collector, it is possible to use, for example, copper, a copper alloy, nickel, and stainless steel.

The negative electrode material layer preferably contains, as a negative electrode active material, a material that electrochemically stores and releases lithium ions. Examples of such a material include a carbon material, a metal compound, an alloy, and a ceramic material. As the carbon material, graphite, non-graphitizable carbon (hard carbon), and easily graphitizable carbon (soft carbon) are preferable, and graphite and hard carbon are particularly preferable. Examples of the metal compound include silicon oxide and tin oxide. Examples of the alloy include a silicon alloy and a tin alloy. Examples of the ceramic material include lithium titanate and lithium manganate. A single one or two or more in combination of these materials may be used. Among these materials, a carbon material is preferable in terms of being capable of decreasing potential of negative electrode 12.

The negative electrode material layer preferably contains a conducting agent, a binder, or the like besides the negative electrode active material. Examples of the conducting agent include carbon black and a carbon fiber. Examples of the binder include fluorine resin, acrylic resin, a rubber material, and a cellulose derivative. Examples of the fluorine resin include polyvinylidene fluoride, polytetrafluoroethylene, and a tetrafluoroethylene-hexafluoropropylene copolymer. Examples of the acrylic resin include poly acrylic acid and an acrylic acid-methacrylic acid copolymer. Examples of the rubber material include styrene-butadiene rubber, and examples of the cellulose derivative include carboxymethyl cellulose.

The negative electrode material layer is formed by, for example, mixing the negative electrode active material, the conducting agent, the binder, and the like with a dispersion medium to prepare a negative electrode mixture paste, and applying the negative electrode mixture paste to the negative current collector and then drying the negative electrode mixture paste.

Negative electrode 12 is preferably pre-doped with lithium ions in advance. This process decreases the potential of negative electrode 12 to increase a difference in potential (that is, voltage) between positive electrode and negative electrode 12 and thus improve energy density of electrochemical device 100.

Pre-doping of negative electrode 12 with the lithium ions is progressed by, for example, forming a metallic lithium film that is to serve as a supply source of the lithium ions on a surface of the negative electrode material layer and impregnating negative electrode 12 including the metallic lithium film with an electrolytic solution (e.g., a nonaqueous electrolytic solution) having lithium-ion conductivity. At this time, the lithium ions are eluted from the metallic lithium film into the nonaqueous electrolytic solution and the eluted lithium ions are stored in the negative electrode active material. For example, when graphite or hard carbon is used as the negative electrode active material, the lithium ions are inserted in between layers of the graphite or in fine pores of the hard carbon. An amount of the lithium ions for the pre-doping can be controlled by a mass of the metallic lithium film.

The step of pre-doping negative electrode 12 with the lithium ions may be performed before assembling electrode group 10, or the pre-doping may be progressed after housing electrode group 10 together with the nonaqueous electrolytic solution in container 101 of electrochemical device 100.

When the electrolytic solution contains anions containing fluorine and aluminum oxide layer 114 is grown on the positive current collector by the above-described application of a small current to the electrochemical device, the application of a small current may be performed before or after the pre-doping or may be performed in parallel with the pre-doping.

(Separator)

Preferably used as separator 13 are a nonwoven fabric made of cellulose fiber, a nonwoven fabric made of glass fiber, a microporous membrane made of polyolefin, a fabric cloth, a nonwoven fabric, and the like. Separator 13 has a thickness ranging, for example, from 10 μm to 300 μm, inclusive, preferably from 10 μm to 40 μm, inclusive.

(Nonaqueous Electrolytic Solution)

Electrode group 10 preferably includes a nonaqueous electrolytic solution.

The nonaqueous electrolytic solution has lithium-ion conductivity and contains a lithium salt and a nonaqueous solvent that dissolves the lithium salt. In this case, anions of the lithium salt are capable of reversibly repeating doping and dedoping to and from positive electrode 11. On the other hand, lithium ions derived from the lithium salt are reversibly stored and released in and from negative electrode 12.

Examples of the lithium salt include $LiClO_4$, $LiBF_4$, $LiAlCl_4$, $LiSbF_6$, LiSCN, $LiCF_3SO_3$, $LiFSO_3$, $LiCF_3CO_2$, $LiAsF_6$, $LiB_{10}Cl_{10}$, LiCl, LiBr, LiI, $LiBCl_4$, $LiN(FSO_2)_2$, and $LiN(CF_3SO_2)_2$. A single one or two or more in combination of these lithium salts may be used. Among these lithium salts, at least one selected from the group consisting of a lithium salt having a halogen atom-containing oxo acid anion, and a lithium salt having an imide anion is preferably used.

The anion of the lithium salt preferably contains fluorine. When the anion contains fluorine, a dense F-containing aluminum oxide layer can be formed on the surface of the positive current collector by flowing a small current through the positive electrode of the electrochemical device.

Concentration of the lithium salt in the nonaqueous electrolytic solution of a charged electrochemical device (charging rate (SOC) 90% to 100%) ranges, for example, 0.2 mol/L to 5 mol/L, inclusive.

As the nonaqueous solvent, it is possible to use, for example, cyclic carbonates such as ethylene carbonate, propylene carbonate, and butylene carbonate; chain carbonates such as dimethyl carbonate, diethyl carbonate, and ethyl methyl carbonate; aliphatic carboxylate esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethylsulfoxide, 1,3-dioxolane, formamide, acetamide, dimethylformamide, dioxolane, acetonitrile, propionitrile, nitromethane, ethylmonoglyme, trimethoxymethane, sulfolane, methyl sulfolane, and 1,3-propanesultone. A single one or two or more in combination of these nonaqueous solvents may be used.

The nonaqueous electrolytic solution may be prepared by adding an additive agent to the nonaqueous solvent as necessary. For example, an unsaturated carbonate such as vinylene carbonate, vinyl ethylene carbonate, or divinyl ethylene carbonate may be added as an additive agent for forming a covering film having high lithium-ion conductivity on a surface of negative electrode 12.

(Manufacturing Method)

Hereinafter, one example of a method for manufacturing electrochemical device 100 of the present invention is described with reference to FIGS. 2 and 3. The method for manufacturing electrochemical device 100 of the present invention, however, is not limited to this example.

Electrochemical device 100 is manufactured by, for example, a method including: a step of forming positive electrode 11 including positive current collector 111 containing aluminum and positive electrode material layer 113 containing a conductive polymer; a step of forming negative electrode 12; a step of forming electrode group 10 including positive electrode 11, negative electrode 12, and separator 13 interposed between positive electrode 11 and negative electrode 12; a step of housing electrode group 10 together with an electrolytic solution in container 101; and a covering film formation step of covering a surface of positive current collector 111 with aluminum oxide layer 114.

The step of forming positive electrode 11 may include a step of laminating positive current collector 111, carbon layer 112 containing a conductive carbon material, and positive electrode material layer 113 in this order. When positive electrode 11 includes carbon layer 112, positive electrode 11 may be formed by laminating carbon layer 112 on positive current collector 111 and forming positive electrode material layer 113 on stacked carbon layer 112.

Positive electrode material layer 113 is formed by, for example, electrolytically polymerizing or chemically polymerizing a raw material monomer in presence of positive current collector 111 provided with carbon layer 112. Alternatively, the positive electrode material layer is formed by applying, for example, a solution containing a conductive polymer or a dispersion of a conductive polymer to positive current collector 111 provided with carbon layer 112. Positive electrode material layer 113 is usually formed in an acidic atmosphere due to an influence of an oxidant or a dopant used.

A lead member (lead tab 105A provided with lead wire 104A) is connected to positive electrode 11 formed as described above, and the other lead member (lead tab 105B provided with lead wire 104B) is connected to negative electrode 12. Subsequently, positive electrode 11 and negative electrode 12 to which these lead members are connected are wound, with separator 13 interposed between the positive electrode and the negative electrode, to give electrode group 10 that is illustrated in FIG. 3. The lead members are exposed from one end surface of the electrode group. An outermost periphery of electrode group 10 is fixed with fastening tape 14.

Next, as illustrated in FIG. 2, electrode group 10 is housed together with a nonaqueous electrolytic solution (not illustrated) in bottomed cylindrical container 101 having an opening. Lead wires 104A, 104B are led out from sealing body 102. Sealing body 102 is disposed in the opening of container 101 to seal container 101. Specifically, container 101 is drawn inward at a part near an opening end, and is curled to swage sealing body 102 at the opening end. Sealing body 102 is formed of, for example, an elastic material containing a rubber component.

The covering film formation step may be performed in the step of forming positive electrode 11 or can be performed after housing electrode group 10 together with electrolytic solution in container 101. When the covering film formation step is performed in the step of forming positive electrode 11, the step of forming a positive electrode includes a step of covering the surface of positive current collector 111 with aluminum oxide layer 114 and then laminating positive electrode material layer 113 on aluminum oxide layer 114. Positive electrode material layer 113 may be laminated on carbon layer 112 after carbon layer 112 is formed on aluminum oxide layer 114.

On the other hand, when the electrolytic solution contains anions containing fluorine, it is also possible to perform the covering film formation step after housing electrode group 10 together with the electrolytic solution in container 101. Application of a charge voltage between positive electrode 11 and negative electrode 12 of electrode group 10 can react aluminum on a surface layer of positive current collector 111 with the anions containing fluorine so that the aluminum is changed into an aluminum oxide. The aluminum oxide that is formed in this way contains fluorine. At this time, by limiting an amount of current flowed at the voltage application to less than or equal to a prescribed current value, uniform and dense aluminum oxide layer 114 can be formed on positive current collector 111. The amount of current s limited to a smaller current value than a value of current flowed when electrochemical device 100 is charged in usual charge operation.

When the covering film formation step is performed to form aluminum oxide layer 114 by the application of a charge voltage while the current value is limited, the application of a charge voltage corresponding to the small current is not limited to a case of the application performed on a manufactured electrochemical device that includes container 101 housing electrode group 10. The voltage may be applied to positive electrode 11 while at least positive electrode 11 is immersed in a solution containing the anions containing fluorine.

In the exemplary embodiment, a wound cylinder-shaped electrochemical device has been described. An application range of the present invention, however, is not limited to the exemplary embodiment described above, and the present invention is also applicable to a square or rectangle-shaped wound or stacked electrochemical device.

EXAMPLES

Hereinafter, the present invention is described in more detail based on examples. The present invention, however, is not to be limited to the examples.

Example 1

(1) Production of Positive Electrode

A stacked body, which was obtained by forming a carbon layer (thickness 2 μm) containing carbon black on both surfaces of a 30-μm-thick aluminum foil, was prepared. Meanwhile, an aqueous aniline solution containing aniline and sulfuric acid was prepared.

The stacked body and an opposite electrode were immersed in the aqueous aniline solution, and electrolytic polymerization was performed at a current density of 10 mA/cm$^2$ for 20 minutes to attach a film of a conductive polymer (polyaniline) doped with sulfate ions ($SO_4^{2-}$) onto the carbon layer each disposed on both surfaces of the stacked body.

The conductive polymer doped with the sulfate ions was reduced for dedoping of the doping sulfate ions. Thus, a positive electrode material layer, which contains the conductive polymer subjected to the dedoping of the sulfate ions, was formed. Next, the positive electrode material layer was sufficiently washed and thereafter dried. The positive electrode material layer had a thickness of 35 μm per one surface.

(2) Production of Negative Electrode

A 20-μm-thick copper foil was prepared as a negative current collector. Meanwhile, a negative electrode mixture paste was prepared by kneading a mixed powder containing 97 parts by mass of hard carbon, 1 part by mass of carboxy cellulose, and 2 parts by mass of styrene-butadiene rubber with water at a ratio by mass of 40:60 (the mixed powder: water). The negative electrode mixture paste was applied to both surfaces of the negative current collector and dried to give a negative electrode including a 35-μm-thick negative electrode material layer each disposed on both surfaces. Next, a metallic lithium layer was formed on the negative electrode material layer. An amount of the metallic lithium layer was calculated so that a potential of the negative electrode, after pre-doping, in an electrolytic solution was less than or equal to 0.2 V with respect to a potential of metallic lithium.

(3) Production of Electrode Group

Lead tabs were respectively connected to the positive electrode and the negative electrode, and then, as illustrated in FIG. 3, a stacked body obtained by alternately stacking a nonwoven fabric separator (thickness 35 μm) made of cellulose, the positive electrode, and the negative electrode was wound to form an electrode group.

(4) Preparation of Nonaqueous Electrolytic Solution

A solvent was prepared by adding 0.2% by mass of vinylene carbonate to a mixture containing propylene carbonate and dimethyl carbonate at a ratio by volume of 1:1. $LiPF_6$ was dissolved as a lithium salt in the obtained solvent at a prescribed concentration to prepare a nonaqueous electrolytic solution containing a hexafluoro phosphate ion ($PF_6^-$) as an anion.

(5) Production of Electrochemical Devices

The electrode group and the nonaqueous electrolytic solution were housed in a bottomed container having an opening to assemble the electrochemical device illustrated in FIG. 2. Thereafter, a charge voltage of 3.6 V was applied between terminals of the positive electrode and the negative electrode of a charged electrochemical device for a prescribed time while the amount of current was limited to a prescribed current value of less than or equal to 4 mA (charge step 1).

Further, a charge voltage of 3.6 V was applied between the terminals of the positive electrode and the negative electrode for 24 hours (charge step 2).

In this case, pre-doping of the negative electrode with lithium ions is performed in parallel with the charge step 1.

The charged electrochemical device was discharged up to 2.5 V at a current of 1.0 A. The total amount of electric charge flowed when the electrochemical device was discharged from 3.6 V to 2.5 V was determined and defined as an amount of electric discharge.

A plurality of devices A1 to A11 were produced by differentiating an amount of electric charge $Q_1$ flowed between the terminals of the positive electrode and the negative electrode in the charge step 1.

The positive electrode was taken out from each of the produced devices, and a surface of the aluminum foil serving as the positive current collector was observed with a TEM to find an amorphous aluminum oxide layer formed between the aluminum foil and the carbon layer. Further, the aluminum oxide layer was confirmed to contain fluorine and phosphorus.

An amount of electric charge $\Delta Q$ consumed by the reaction with the base material was determined by deducting an amount of electric discharge $Q_3$ from a total of an amount of electric charge $Q_2$ flowed between the terminals of the positive electrode and the negative electrode in the charge step 2 and the amount of electric charge $Q_1 (\Delta Q = Q_1 + Q_2 - Q_3)$. The amount of electric charge $\Delta Q$ includes capacitance (an amount of electric charge) consumed for the formation of the F-containing aluminum oxide layer.

The produced electrochemical devices A1 to A11 were evaluated by following methods.

(Evaluations)

The electrochemical device was charged at a voltage of 3.6 V and then left at 25° C. for 24 hours. An open-circuit voltage was measured after the device was left for 24 hours, and an amount of voltage decrease $\Delta RV$ from immediately after the charge was determined. The smaller the $\Delta RV$ is, the self-discharge of the device is more suppressed. Table 1 shows evaluation results.

TABLE 1

| | $Q_1$ (mAh) | $\Delta Q$ (mAh) | $\Delta RV$ (V) |
|---|---|---|---|
| A1 | 0 | 0 | 0.297 |
| A2 | 10 | 0 | 0.241 |
| A3 | 20 | 6 | 0.187 |
| A4 | 48 | 6 | 0.119 |

TABLE 1-continued

|     | $Q_1$ (mAh) | $\Delta Q$ (mAh) | $\Delta RV$ (V) |
|-----|-------------|------------------|-----------------|
| A5  | 68          | 12               | 0.094           |
| A6  | 88          | 17               | 0.074           |
| A7  | 132         | 40               | 0.051           |
| A8  | 156         | 57               | 0.034           |
| A9  | 176         | 73               | 0.026           |
| A10 | 196         | 91               | 0.013           |
| A11 | 216         | 102              | 0.010           |

Table 1 shows that the device having a larger amount of electric charge $Q_1$ flowed between the terminals of the positive electrode and the negative electrode in the charge step 1 has a smaller $\Delta RV$ and suppresses the self-discharge.

Here, the amount of electric charge $\Delta Q$ is considered to be proportional to the film thickness of the F-containing aluminum oxide layer formed on the positive current collector. Accordingly, forming a thicker F-containing aluminum oxide layer can suppress the self-discharge of the electrochemical device.

An electrochemical device according to the present invention suppresses self-discharge and is therefore suitable as various electrochemical devices, particularly as a back-up power source.

The invention claimed is:

1. An electrochemical device comprising:
a positive electrode;
a negative electrode; and
a separator disposed between the positive electrode and the negative electrode, wherein:
the positive electrode includes:
a positive current collector containing aluminum;
a positive electrode material layer containing a conductive polymer; and
an aluminum oxide layer disposed on a surface of the positive current collector, and
the aluminum oxide layer includes a F-containing aluminum oxide layer that contains fluorine and an amorphous phase at an amount greater than an amount of a crystalline phase.

2. The electrochemical device according to claim 1, wherein the aluminum oxide layer further contains phosphorus.

3. The electrochemical device according to claim 1, wherein a product of A and B ranges from 4 to 300, inclusive,
where A (g/cm$^3$) denotes a density of the positive electrode material layer, and B (μm) denotes a thickness of the positive electrode material layer.

4. The electrochemical device according to claim 3, wherein the density A of the positive electrode material layer ranges from 0.2 g/cm$^3$ to 1.5 g/cm$^3$, inclusive.

5. The electrochemical device according to claim 3, wherein the thickness B of the positive electrode material layer ranges from 20 μm to 200 μm, inclusive.

6. The electrochemical device according to claim 1, wherein the aluminum oxide layer is disposed on an entirety of a surface of the positive current collector, the surface of the positive current collector facing the positive electrode material layer.

7. The electrochemical device according to claim 1, further comprising a carbon layer containing a conductive carbon material, the carbon layer being disposed between the positive electrode material layer and the aluminum oxide layer.

8. The electrochemical device according to claim 7, wherein
a density of the carbon layer ranges from 0.4 g/cm$^3$ to 1.0 g/cm$^3$, inclusive, and
a thickness of the carbon layer ranges from 0.5 μm to 3.0 μm, inclusive.

9. A method for manufacturing an electrochemical device, the method comprising:
a step of forming a positive electrode including a positive current collector and a positive electrode material layer, the positive current collector containing aluminum, the positive electrode material layer containing a conductive polymer;
a step of forming a negative electrode;
a step of forming an electrode group including the positive electrode, the negative electrode, and a separator interposed between the positive electrode and the negative electrode;
a step of housing the electrode group together with an electrolytic solution in a container; and
a covering film formation step of covering a surface of the positive current collector with an aluminum oxide layer containing fluorine, wherein:
the aluminum oxide layer includes a F-containing aluminum oxide layer that contains fluorine and an amorphous phase at an amount greater than an amount of a crystalline phase,
the covering film formation step is performed in the step of forming a positive electrode,
the covering film formation step is a step of changing aluminum in a surface layer of the positive current collector to aluminum oxide by flowing a current between the positive electrode and the negative electrode in a current value limited to less than a current value for charging of the electrochemical device while immersing the positive electrode in a solution including anions containing fluorine, and
in the covering film formation step, the current value flowing between the positive electrode and the negative electrode is less than or equal to 10 mA.

10. A method for manufacturing an electrochemical device, the method comprising:
a step of forming a positive electrode including a positive current collector and a positive electrode material layer, the positive current collector containing aluminum, the positive electrode material layer containing a conductive polymer;
a step of forming a negative electrode;
a step of forming an electrode group including the positive electrode, the negative electrode, and a separator interposed between the positive electrode and the negative electrode;
a step of housing the electrode group together with an electrolytic solution in a container; and
a covering film formation step of covering a surface of the positive current collector with an aluminum oxide layer containing fluorine, wherein:
the aluminum oxide layer includes a F-containing aluminum oxide layer that contains fluorine and an amorphous phase at an amount greater than an amount of a crystalline phase, the covering film formation step is performed after housing the electrode group together with the electrolytic solution in the container,
the electrolytic solution contains anions, and
the covering film formation step is a step of changing aluminum in a surface layer of the positive current collector to aluminum oxide by flowing a current between the positive electrode and the negative electrode of the electrochemical device in a current value limited to less than a current value for charging of the electrochemical device, and in the covering film formation step, the current value flowing between the positive electrode and the negative electrode is less than or equal to 10 mA.

11. The method for manufacturing an electrochemical device according to claim 9, wherein the step of forming a positive electrode includes a step of forming the positive electrode material layer on the aluminum oxide layer after covering the surface of the positive current collector with the aluminum oxide layer.

12. The method for manufacturing an electrochemical device according to claim 9, wherein the step of forming a positive electrode includes a step of laminating the positive current collector, a carbon layer containing conductive carbon material, and the positive electrode material layer in this order.

13. The method for manufacturing an electrochemical device according to claim 10, wherein the step of forming a positive electrode includes a step of laminating the positive current collector, a carbon layer containing conductive carbon material, and the positive electrode material layer in this order.

14. The electrochemical device according to claim 1, wherein a ratio of the amorphous phase to the crystalline phase in the aluminum oxide layer have a gradient distribution in a thickness direction of the aluminum oxide layer.

15. The electrochemical device according to claim 1, wherein a content proportion of the fluorine in the aluminum oxide layer have a gradient distribution in a thickness direction of the aluminum oxide layer.

* * * * *